(12) United States Patent
Huybrechts et al.

(10) Patent No.: US 6,558,796 B2
(45) Date of Patent: May 6, 2003

(54) AQUEOUS COATING COMPOSITIONS WITH PHOSPHONIC ACID BASED COMPOUNDS

(75) Inventors: Josef Huybrechts, Oud-Turnhout (BE); Paul Bruylants, Hevez (BE); Michael Koerner, Koenigswinter (DE); Kenneth S. Kirshenbaum, West Bloomfield, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/731,305

(22) Filed: Dec. 6, 2000

(65) Prior Publication Data

US 2002/0102407 A1 Aug. 1, 2002

(51) Int. Cl.$^7$ ............................................... B23B 27/38
(52) U.S. Cl. ............... 428/414; 106/14.12; 106/14.14; 106/287.17; 106/287.22; 428/413; 428/416; 523/457; 523/458
(58) Field of Search ................. 106/14.12, 14.14, 106/287.17, 287.22; 428/413, 414, 416; 523/400, 457, 458; 524/440, 441

(56) References Cited

U.S. PATENT DOCUMENTS

| | | | | |
|---|---|---|---|---|
| 4,276,392 A | * | 6/1981 | Chattha | 525/118 |
| 4,403,003 A | | 9/1983 | Backhouse | |
| 4,434,256 A | | 2/1984 | Dworak et al. | |
| 4,621,112 A | * | 11/1986 | Backhouse et al. | 524/145 |
| 4,675,358 A | | 6/1987 | Frangou | |
| 5,034,556 A | | 7/1991 | Kahle, II | |
| 5,151,125 A | | 9/1992 | Kuwajima et al. | |
| 5,332,767 A | | 7/1994 | Guenter et al. | |
| 5,429,674 A | | 7/1995 | Lamers et al. | |
| 6,110,341 A | * | 8/2000 | McMurdie et al. | 204/489 |
| 6,406,753 B2 | * | 6/2002 | Dworak et al. | 427/379 |

FOREIGN PATENT DOCUMENTS

| WO | WO99/06450 | 2/1999 |
|---|---|---|
| WO | WO 9906450 A | 2/1999 |

OTHER PUBLICATIONS abstract of JP 60–063261.

* cited by examiner

Primary Examiner—Robert Dawson
Assistant Examiner—Marc S Zimmer
(74) Attorney, Agent, or Firm—Sudhir G. Deshmukh

(57) ABSTRACT

The invention is directed to gassing stabilized aqueous coating compositions comprising A) a metallic pigment and at least one reaction product of:
(a) 5 to 95 weight percent of a at least one phosphonic acid derivative selected form compound I and II

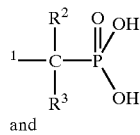

and

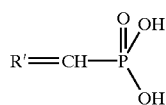

wherein $R^1$ is H or $O=P(OH)_2$; $R^2$ and $R^3$ are independently H, OH or an aliphatic, cycloaliphatic and aromatic substituent having 1 to 25 carbon atoms and optionally up to 10 heteroatoms of at least one of oxygen and phosphorus; and R' is an aliphatic, cycloaliphatic and aromatic substituent having 1 to 25 carbon atoms and optionally up to 10 heteroatoms of at least one of oxygen and phosphorus;

(b) 5 to 95 weight percent of a at least one compound having at least two epoxy groups and a number average molecular weight Mn of 300 to 5000 g/mol; and (c) 0 to 90 weight percent of a compound having one epoxy-functional group, wherein the proportions by weight of components (a), (b) and (c) total 100 weight percent.

B) at least one metallic pigment.

12 Claims, No Drawings

AQUEOUS COATING COMPOSITIONS WITH PHOSPHONIC ACID BASED COMPOUNDS

FIELD OF THE INVENTION

The invention concerns aqueous coating compositions with aluminum flakes and phosphonic acid derivate based passivator resin.

BACKGROUND OF THE INVENTION

In principle, the problem when using metallic special-effect pigments, particularly aluminum pigments in waterborne coatings, is that the aluminum pigments react with the water to form aluminum hydroxide, with the generation of hydrogen. It is necessary, therefore, to stabilize these pigments in aqueous media. Commercial aluminum pigments for aqueous systems are, therefore, generally chromated, phosphated or coated with silica or polymer. Moreover, the aluminum pigments may be stabilized by passivators also present in the coating agent. This is advantageous and necessary, particularly in those fields of application where a relatively long storage time of the waterborne coating agents, e.g., a long term storage stability of about 12–24 months in vehicle refinishing, is required.

Various possibilities of stabilizing/passivating aluminum pigments in aqueous systems are known in the prior art. U.S. Pat. No. 4,675,358 discloses coating compositions employing phosphoric acid compounds, which are reaction products of an addition polymer with a hydroxyl group, a monomeric alcohol and a phosphoric acid derivate. Such compositions are not very hydrolytically stable. WO-A-96/08518 (U.S. Pat. No. 5,429,674) describes N-acyl aminomethylene phosphonates and derivatives and their use in waterborne coatings. Such compositions have limited compatibility with other binders and limited durability because of N-containing linkages. EP-A-391 230 (U.S. Pat. No. 5,034,556) discloses compounds which are the reaction product of an alpha-aminomethylene phosphonic acid with an epoxy group of a compound containing at least one epoxy group. Such reaction products have limited end use in water-borne compositions that are anionically stabilized since the amino groups destabilize the coating composition. U.S. Pat. No. 5,151,125 discloses aqueous metallic coating compositions comprising acrylic copolymers prepared by copolymerizing an ethylenic unsaturated monomer and a phosphate monomer to reduce the gassing of aluminum flakes. Such compositions have limited hydrolytic stability and limited effectiveness. EP-A-170 474 (U.S. Pat. No. 4,621,112) discloses reaction products of compounds having a phosphoric acid group —O—PO(OH)$_2$) with compounds having an epoxy group. Such reaction products only give limited gassing stability. WO-A-99/06450 describes aqueous coating compositions with passivator compounds based on a reaction product of a phosphonic acid derivate and a hydroxy-functional addition polymer. These formulations don't show a good balance between gassing performance and final color stability.

The object of the invention was, therefore, to overcome the disadvantages of the prior art and to provide aqueous coating compositions containing metallic pigments, which compositions have reproducibly good gassing stability, even after prolonged storage, without adversely affecting color properties of the coatings obtained therefrom. Coatings obtained from the coating compositions should exhibit no change of color shade and no impairment of brightness and metallic flop.

SUMMARY OF THE INVENTION

The object was achieved by aqueous coating compositions that contain reaction products of phosphonic acid derivatives and epoxy compounds as passivator component for the metallic pigments.

The present invention is directed to aqueous coating compositions comprising:
A) at least one reaction product of
  (a) 5 to 95 weight percent, preferred 10–60 weight percent, of at least one phosphonic acid derivative selected from compounds I and II

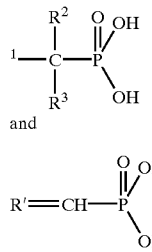

and $$R'=CH-P\begin{array}{c}O\\ \diagup\\ \diagdown\end{array}\begin{array}{c}OH\\ \\ OH\end{array}$$

wherein $R^1$ is selected from the group consisting of H or O=P(OH)$_2$; $R^2$ and $R^3$ are independently selected from the group consisting of H, OH and an aliphatic, cycloaliphatic or aromatic substituent having 1 to 25 carbon atoms and optionally up to 10 heteroatoms of at least one of oxygen and phosphorus; and R' is selected from the group consisting of an aliphatic, cycloaliphatic or aromatic substituent having 1 to 25 carbon atoms and optionally up to 10 heteroatoms of at least one of oxygen and phosphorus;
  (b) 5 to 95 weight percent, preferred 40–90 weight percent of at least one compound having at least two epoxy groups and a number average molecular weight Mn of 300 to 5000 g/mol; and
  (c) 0 to 90 weight percent of a compound having one epoxy-functional group, wherein the proportions by weight of components (a), (b) and (c) total 100 weight percent; and
B) at least one metallic pigment.

DETAILED DESCRIPTION OF THE EMBODIMENTS

It was surprisingly found that the above described hydrophobic-substituted phosphonic acid based compounds A) are particularly effective for inhibiting the corrosion of metallic pigments in aqueous coating compositions and that aqueous coating compositions containing the phosphonic acid based compounds show a very good balance between antigassing performance and appearance as well as color properties of the applied coatings.

In a most preferred embodiment, the present invention is directed to aqueous coating compositions comprising
A) 0.1–5 weight percent, preferred 0.3–3 weight percent of at least one reaction product specified above,
B) 0.5–30 weight percent, preferred 1–15 weight percent of at least one metallic pigment,
C) 1–30 weight percent, preferred 5–25 weight percent of at least one film forming binder,
D) 15–85 weight percent, preferred 40–80 weight percent of water and optionally
E) 1–25 weight percent, preferred 5–12 weight percent of pigments, which are different from component B), organic solvents and/or additives which are conventionally used in coating compositions, wherein the proportions by weight of component A), B), C), D) and E) total 100 weight percent.

Component A) of the coating compositions according to the invention are reaction products of the components a), b) and optionally c). Preferred components A) have a number average molecular mass Mn of 400–20000 g/mole, most preferably 600–5000 g/mole and an acid value of 25–300 mg KOH/g, most preferably 40–200 mg KOH/g.

The reaction products A) are preferably made at a temperature between 50° C. and 180° C. in a solvent, a solvent blend or a water/solvent blend. Catalysts can used to speed up the reaction. Typical catalysts known to shorten the reaction time between epoxy and acid groups are metal salts, amines and quaternary ammonium salts. Examples are sodium, potassium and lithium hydroxide, triethylamine, benzyldimethylamine, cyclohexyldimethylamine, triethylammoniumchloride, triethylammoniumbromide, triethylammoniumiodide and triethylbenzyl phosphonium bromide.

Compounds corresponding to the general formula I, preferably with R=C1- to C10-alkyl, may be used as component a). The alkyl radicals may be substituted by heteroatoms such as oxygen, phosphorus or silicon. Examples hereof are ethyl, propyl, butyl, pentyl, hexyl, heptyl, octyl and nonylphosphonic acid. It is also possible to use derivatives of diphosphonic acid as component a). For example, these may then be 1-hydroxyalkane-1,1-diphosphonic acids. An example of the latter is 1-hydroxyethane-1,1-diphosphonic acid. Moreover, compounds corresponding to the general formula II, preferably with R'=C1- to C10-alkyl may be used as component a). The alkyl radicals may be substituted by heteroatoms such as oxygen, phosphorus or silicon. A preferred example of compounds corresponding to formula II is vinylphosphonic acid. Ethylphosphonic acid, propylphosphonic acid, octylphosphonic acid and vinylphosphonic acid may be used preferably as component a). Mixtures of several phosphonic acid derivates a) can be used.

The epoxy compounds b) are polyepoxides with an average of at least 2 epoxy groups per molecule. These epoxy compounds can be saturated, unsaturated, cyclic, acyclic, aliphatic, cycloaliphatic, aromatic or heterocyclic. They may contain substituents such as halogen, hydroxyl, ether, alkyl and/or aryl groups. In general the epoxide equivalent weight of the epoxy compounds b) will range from 150 to about 4,000, typically from 150 to about 1500.

The epoxy compounds b) preferably comprise polyglycidyl ethers based on polyhydric, preferably dihydric alcohols, phenols, hydrogenation products of these phenols and novolaks (condensation products of phenols with aldehydes). The preferred epoxy equivalent weights of these epoxy compounds are between 160–500. The polyglycidyl ethers based on polyhydric, preferably dihydric phenols obtained by reacting an epihalohydrin, such as epichlorohydrin or epibromohydrin, with a polyphenol/diphenol in the presence of an alkali. Examples of polyhydric phenols are resorcin, hydroquinone, 2,2-bis-(4-hydroxyphenyl) propane (bisphenol A), dihydroxydiphenylmethane (bisphenol F, optionally mixtures of isomers), 4,4'-dihydroxy-3,3'-dimethyldiphenylpropane, 4,4'-dihydroxydiphenyl, 4,4'-dihydroxydiphenylcyclohexane, 4,4'-dihydroxybenzophenol, bis-(4-hydroxyphenyl)-1,1-ethane, 1,5-dihydroxynaphthalene and the hydrogenated derivatives of such compounds.

The polyglycidyl ethers based on polyhydric, preferably dihydric alcohols, obtained by reacting an epihalohydrin, such as epichlorohydrin or dichlorohydrin, with a aliphatic or cycloaliphatic polyhydric alcohol in the presence of an alkali. Examples of polyhydric alcohols are ethylene glycol, diethylene glycol, triethylene glycol, 1,2- and 1,3-propylene glycol, polyoxypropylene glycols, 1,4-butylene glycol, 1,5-pentane diol, 1,6-hexane diol, glycerin, bis-(4-hydroxycyclohexyl)-2,2-propane.

Polyglycidyl esters of polycarboxylic acids, which are obtained by reaction of, for example, epichlorhydrine with an aliphatic, aromatic or cycloaliphatic polycarboxylic acid, can also be used as component b). Examples of polyglycidyl esters of polycarboxylic acids are diglycidyl esters of adipic acid, diglycidyl esters of phthalic acid and diglycidyl esters of hexahydrophthalic acid.

Addition polymerized resins containing at least two epoxy groups may also be employed as component b). Such materials may be produced by the addition polymerization of unsaturated epoxy functional monomers, like (meth)allyl glycidyl ether, 3,4-epoxy-1-vinylcyclohexane, epoxycyclohexyl (meth)acrylate, vinyl glycidyl ether, 2-methyl glycidyl (meth)acrylate and glycidyl (meth)acrylate, typically in combination with ethylenically unsaturated monomers such as styrene, alpha-methyl styrene, alpha-ethyl styrene, vinyl toluene, t-butyl styrene, acrylamide, methacrylamide, acrylonitrile, methacrylonitrile, ethacrylonitrile, ethyl methacrylate, methyl methacrylate, isopropyl methacrylate, isobutyl methacrylate, hydroxyethyl acrylate, hydroxyethyl methacrylate, 2-ethylhexyl acrylate, 2-ethylhexyl methacrylate, isobornyl methacrylate, and the like.

Polyglycidyl ethers based on polyhydric, preferably dihydric phenols, are preferably used as component b). Polyglycidyl ethers of bisphenol A and polyglycidyl ethers of bisphenol F are especially preferred as component b). These products are commercially available, e.g. under the trade name Epicote® from Shell, for example Epicote® 828, Epicote® 1001, Epicote® 1004 or Epicote® 1007.

Mixtures of several epoxy compounds b) can be used.

Examples of mono epoxy compounds (component c) which may be utilized include compounds as simple as ethylene oxide, propylene oxide, butylene oxide, cyclohexene oxide, and the like. Representative examples of mono epoxy compounds (component c) are: alkyl, cycloalkyl, aryl and mixed aryl-alkyl monoglycidyl ethers as e.g. butyl glycidylether, phenyl glycidylether, tert.-butylphenyl glycidylether, 2-ethylhexyl glycidylether, cyclohexyl glycidylether, benzyl glycidylether. Further examples are alkyl, cycloalkyl, aryl and mixed aryl-alkyl monoglycidyl esters. Examples for glycidyl esters are the glycidyl esters of saturated monocarboxylic acids branched in the alpha position, e.g., the glycidyl esters of saturated alpha-alkylalkane monocarboxylic acids or alpha, alpha'-dialkylalkane monocarboxylic acids. Preferred these are glycidyl esters of saturated alpha, alpha'-dialkylalkane monocarboxylic acids having 7 to 13 carbon atoms in the molecule, particularly preferably having 9 to 11 carbon atoms in the molecule. These products are commercially available, e.g. the versatic 10 acid glycidyl ester known under the trade name Cardura® E10 from Shell.

Other epoxy compounds having one epoxy group which may be utilized include: the monoglycidyl esters of monocarboxylic acids, such as glycidyl benzoate, glycidyl naphthoate as well as the monoglycidyl esters of substituted benzoic acid and naphthoic acids. Further examples of suitable mono epoxy compounds are those with olefinically unsaturated double bonds. These epoxy-fuctional monomers include e.g. (meth)allyl glycidyl ether, 3,4-epoxy-1-vinylcyclohexane, epoxycyclohexyl (meth)acrylate, vinyl glycidyl ether, 2-methyl glycidyl (meth)acrylate and glycidyl (meth)acrylate.

Mixtures of several mono epoxy compounds c) can be used.

The relative proportions in which the phosphonic acid derivate a), the compound containing at least two epoxy groups b) and optionally the mono epoxy compound c) may be reacted together to form the reaction product (component A) may vary widely. However, typically the amount phosphonic acid derivate a) and epoxy compound b) and optionally mono epoxy compound c) are chosen to provide a ratio of moles of epoxy groups to moles of replaceable hydrogens from the phosphonic acid group(s) in a preferred range of 1:1.05 to 1:10. If component c) is also reacted, it is used preferably in amounts from 0 to 60 wt-%, based on the total amount of components a), b) and c). The aqueous coating compositions according to the invention contain metallic pigments as component B). Examples of metallic pigments for utilization in the waterborne coating composition of the invention include any metallic pigments which are generally known for use in pigmented waterborne coating compositions. Examples include metallic pigments, particularly metallic flake pigments, composed of aluminum, copper, zinc and/or brass as well as those composed of other malleable metals and alloys such as nickel, tin, silver, chrome, aluminum-copper alloy, aluminum-zinc alloy, and aluminum-magnesium alloy. Aluminum flake pigments are preferred. Untreated pure aluminum pigments or aluminum pigments already pretreated for use in waterborne coating agents may be used. The latter may be chromated, for example, or coated with polymers.

Preferred coating compositions according to the invention contain at least one film-forming polymer (component C). Any number of the film-forming polymers known to the skilled person of the kind conventionally used for the preparation of aqueous coating compositions may be used. They may be conventional water-dilutable binders based on for example vinyl polymers, (meth)acrylic copolymers, polyesters, polyurethanes, alkyd resins, epoxy resins and polyamine resins and modified forms of the resins mentioned. The binders may be used on their own or in combination with one another.

In order to ensure sufficient water dilutability of the binders, these are modified in a suitable manner to render them hydrophilic. The binders may be ionically or non ionically modified. An anionic and/or non ionic modification is preferred. An anionic modification may be obtained, for example, by incorporating carboxyl groups which are at least partially neutralized. A non ionic modification may be obtained, for example, by incorporating polyethylene oxide units.

Cross-linking agents for cross-linking the film-forming binders may also be contained in the coating compositions according to the invention. The cross-linking agents are conventional cross-linking agents for coating compositions known to the skilled person. Examples hereof include polyisocyanates, blocked polyisocyanates and aminoresins. The choice of cross-linking agents depends on the functional groups of the film-forming binders available for cross-linking.

Component A) should be contained in the aqueous coating compositions according to the invention in an amount such that sufficient gassing stability of the metallic pigments is achieved. The amount of component A) in the coating compositions depends, therefore, in particular on the amount of metallic pigments that are present. The amount of phosphorus present in component A) is particularly important.

The amount of component A) is selected, therefore, preferably in such a way that the proportion of phosphorus in component A) is 0.2–5.0 wt-%, particularly preferably 0.8–3.5 wt-%, based on the amount of metallic pigment. That is, with small amounts of phosphorus in component A) (i.e. small amounts of compound a)), a relatively large amount of component A) should be used in the coating composition in order to ensure the required quantity proportions of phosphorus. The amount of compound a) in component A) should, in turn, be large enough to confer on component A) an acid value which ensures good water dispersibility. A minimum acid value of 20 mg KOH/g should be present.

Component A) is used preferably in salt form after neutralization with a base. Examples of suitable neutralizing agents include ammonia or amines such as N,N-dimethylethanolamine and triethylamine. Neutralization may take place particularly preferably after mixing component A) with the metallic pigments.

The coating compositions further contain water (component D), e.g. at least 15 wt-%, preferably 40–80 wt-% water.

The aqueous coating composition of the invention may also include, and typically does include, one or more of a wide variety of other pigments which are different from the metallic pigments (component B) and generally known for use in coating compositions, including color and/or special effect pigments. Suitable color pigments are all pigments of an organic or inorganic nature which are conventionally used in coating compositions. Examples of inorganic or organic color pigments are titanium dioxide, Micronesia titanium dioxide, iron oxide pigments, carbon black, azo pigments, phthalocyanine pigments, quinacridone, perylene or pyrrolopyrrole pigments. Optionally soluble dyes and/or transparent pigments can also be included.

Examples of special effect pigments which may be used are interference pigments such as metallic pigments coated by metal oxides, e.g., titanium dioxide-coated, iron oxide-coated or mixed oxide-coated aluminum; coated mica, such as titanium dioxide-coated mica and/or mica coated with other metal oxides, e.g. with $Fe_2O_3$ and/or $Cr_2O_3$, iron oxide flake; and graphite pigments. Further examples of special effect-imparting pigments which may be used are the so-called OV-pigments (OV=optical variable) and the so-called LCP-pigments (LCP=liquid crystal polymer). All pigments that can be used, can be used each individually or in combination.

The coating compositions can likewise contain organic solvents and additives conventionally used in coating compositions. The organic solvents may originate from the preparation of the binders or are added separately. Examples of suitable solvents are monohydric or polyhydric alcohols, e.g. propanol, butanol, hexanol; glycol ethers or esters, for example diethylene glycol dialkyl ether, dipropylene glycol dialkyl ether, each with C1- to C6-alkyl, ethoxypropanol, butyl glycol; glycols, for example ethylene glycol, propylene glycol, N-methyl pyrrolidone and ketones, e.g. methyl ethyl ketone, acetone, cyclohexanone; aromatic or aliphatic hydrocarbons, for example toluene, xylene, or straight-chain or branched aliphatic C6–C12-hydrocarbons. It is preferred to use water-miscible solvents.

Examples of additives conventionally used in coating compositions are leveling agents, rheology-influencing agents, such as highly dispersed silicic acid or polymeric urea compounds, thickeners, such as carboxyl group-containing polyacrylate thickeners or associative thickeners based on polyurethane, defoamers, surface-active agents, anti-crater agents, bonding agents and curing accelerators. The additives may be employed in the coating compositions of this invention. If used, these additives are used in conventional amounts known to the skilled person.

Various procedures may be used for preparing the aqueous coating composition of the invention. One method is to bring the metallic pigment (component B) into contact with the phosphonic acid based passivator (component A) prior to the incorporation of the pigment into the aqueous coating composition. This may be done by adding the passivator compound to the metallic pigments or a metallic pigment paste (e.g., pigment as normally supplied commercially), or it may be added at an earlier stage such as during the actual production of the pigment. Alternatively, the passivator compound of the invention may be introduced into the aqueous coating composition of the invention by simply introducing it as a further ingredient in the formulation of the aqueous coating composition, for example during the mixing of film-forming resin, metallic pigment and aqueous medium together with other conventional and optional constituents such as crosslinking agents, co-solvents, thickeners and other pigments. Preferably used is the method of adding the passivator compound to the metallic pigments or a metallic pigment paste. Especially preferred is adding the passivator compound to the metallic pigments or a metallic pigment paste, neutralizing the passivator compound with a base and dispersing the neutralized mixture in the aqueous phase. Also preferred is to dissolve the passivator compound in an organic solvent and then dispersing the metallic pigments or pigment paste in this mixture.

The aqueous coating composition with metallic pigments according to the invention can be expediently used in connection with a multi-layer coating. They are, in particular, suitable for the preparation of single stage top coat layers and especially for the preparation of base coat layers in a multi-layer coating.

The application of the pigmented aqueous coating compositions prepared according to the invention is carried out according to conventional methods, preferably by spray application. The coating compositions are for example applied in resulting dry film thicknesses of 10–30 µm. Metal and plastics substrates, in particular those known in the vehicle industry, are suitable. Examples include, iron, zinc, aluminium, magnesium, or alloys thereof, and polyurethanes, polycarbonates, or polyolefins. Said substrates are usually precoated, for example, with conventional primers and/or conventional fillers. The waterborne basecoat layers may however also be applied to intact existing coatings (finishes or repair coatings) or primed new parts, e.g. primed plastics parts.

The coating composition according to the invention can be cured at room temperature or force-cured at higher temperatures, for example of up to 80° C., preferably of 40 to 60° C. They can, however, also be cured at higher temperatures of for example 80–150° C.

Subsequently, the applied base coat compositions can be coated over with transparent clear coats. The clear coats may thereby be applied to the base coat layer either after drying and/or curing of the base coat layer or wet-on-wet, optionally after a flash-off phase. Preferably the clear coats are applied wet-on-wet to the base coat layer. The flash-off time may be, for example, 15 to 45 minutes, depending on the relative humidity.

In principle, suitable clear coats are all the well-known non-pigmented or transparent-pigmented coating agents of the kind customarily used, for example, in motor vehicle coating. The clear coats may be solvent-based or water-based or powder clear coats. The clear coats may be cured as described above for the curing of the base coat. For example, curing may be carried out at room temperature over a period of several hours or by forced drying at temperatures of for example 40° C. to 60° C., e.g., within 30 to 80 minutes.

The aqueous coating composition according to the invention can be used for industrial and vehicle coating.

The coating compositions according to the invention exhibit a balanced relationship between very good gassing stability and good reproducibility of visual properties of the coatings obtained from them. In particular, good stability of color shade, sufficient brightness and a good metallic flop effect are obtained, whereas when known passivators are used good gassing stability may be obtained at times only at the expense of the appearance and optical characteristics of the coatings obtained. The passivators (component A) used in the coating compositions according to the invention efficiently prevent or reduce the gassing of untreated metallic pigments. They may also, however, be used very satisfactorily for typical pretreated metallic pigments of the kind used for waterborne coating agents. The passivators (component A) may be incorporated very satisfactorily in the aqueous coating compositions. They can be converted easily, particularly in the neutralized form, separately or preferably in mixture with the metallic pigments, to the aqueous phase.

EXAMPLES

1. Preparation of Phosphonic Acid—Epoxy Adducts:

Preparation Example 1

In a 3-neck flask equipped with a thermometer, an air powered stirrer and a water cooled condenser were charged 582 grams of octyl phosphonic acid (100% solid material), 740 grams of Epicote® 828 (a bisphenol A type bis epoxyether available from Shell), 2.6 grams of dimethylethanol amine and 800 grams of butylcellosolve. The contents of the flask were held at 80° C. until a constant acid value was obtained (approximately 6 hours). The resin solution was diluted further with 78.4 grams of butylcellosolve.

| Test results: | |
|---|---|
| Solids: | 66.4% |
| Viscosity: | T-¼ (Gardner-Holdt) |
| Acid value: | 160.1 |
| Mn: | 920 |
| Mw: | 1220 |

Preparation Example 2

In a flask equipped as described in example 1,970 grams of Epon® 1001 (a bisphenol A epoxyether available from Shell) was dissolved in 510 grams of butylcellosolve at 80° C. Next were added a solution of 332 grams octyl phosphonic acid in 348 grams of butylcellosolve followed by 2.6 grams of dimethylethanol amine and 7.4 grams of butylcellosolve. The contents of the flask were heated at 80° C. until a constant acid value was obtained.

| Test results: | |
|---|---|
| Solids: | 64.4 |
| Viscosity: | Z |
| Acid value: | 97.5 |
| Mn: | 1640 |
| Mw: | 3340 |

Preparation Example 3

The procedure of example 2 was repeated with 1940 grams of Epon® 1001 in 930.6 grams of butylcellosolve dissolved in the reactor to which were added 498 grams of octyl phosphonic acid in 684.4 grams of butylcellosolve. Next were added 4.9 grams of dimethylethanol amine and 5.1 grams of butylcellosolve.

| Test results: | |
|---|---|
| Solids: | 65.2 |
| Viscosity: | Z1 + ½ |
| Acid value: | 69.1 |
| Mn: | 1720 |
| Mw: | 3180 |

2. Preparation of Aluminum Containing Refinish Water Borne Basecoats with the Phosphonic Acid—Epoxy Adducts:

In comparative example 1 a known passivator (Lubrizol® 2062) was used instead of the passivator according to the invention.

Preparation of Aluminum Slurries in Solvent:

| Ingredient (parts by weight) | Slurry Comparative Example 1 | Slurry Example 1 | Slurry Example 2 |
|---|---|---|---|
| Butylglycol | 54.88 | 55.26 | 55.04 |
| Lubrizol ® 2062[1] | 7.40 | | |
| Phosphonic preparation example 1 | | 7.02 | |
| Phosphonic preparation example 2 | | | 7.24 |
| SS6246 AR[2] | 36.14 | 36.14 | 36.14 |
| Dimethylethanolamine | 1.58 | 1.58 | 1.58 |

[1]Phosphoric acid based passivator from Lubrizol Co
[2]Aluminum flakes from Silberline Ltd Preparation: The passivator was dissolved in butylglycol. In this mixture the aluminum flakes were dispersed for 4 hours. Before inversion into the aqueous phase the mixture was neutralized with dimethylethanolamine.

Preparation of Waterborne Tints for Aqueous Basecoats:

| Ingredient (parts by weight) | Tint Comparative Example 1 | Tint Example 1 | Tint Example 2 |
|---|---|---|---|
| Latex[3] | 27.54 | 27.47 | 27.64 |
| Deionized Water | 33.66 | 33.58 | 33.67 |
| Balab 3056A[4] | 0.01 | 0.01 | 0.01 |
| Alu slurry compar. 1 | 20.47 | | |
| Alu slurry ex 1 | | 20.43 | |
| Alu slurry ex 2 | | | 20.59 |
| Deionized water | 16.88 | 16.84 | 16.58 |
| Acrysol ® ASE-60[5] | 1.44 | 1.84 | 1.51 |

[3]Self-crosslinkable acrylic latex (U.S. Pat. No. 5006413, example 1, 35% in water)
[4]Defoamer (Witco)
[5]Thickener (Rohm & Haas)

Preparation: The aluminum slurry was added to a mixture of the acrylic latex and water under mixing. After adding the slurry mixing continued for 2 hours. The strength was adjusted with deionized water. This mixture was thickened to a viscosity of 3500 cPs (Brookfield 5RPM)

Preparation of Refinish Water Borne Basecoats:

| Ingredient (parts by weight) | Paint Comparative Example 1 | Paint Example 1 | Paint Example 2 |
|---|---|---|---|
| Tint comp. Example 1 | 70 | | |
| Tint example 1 | | 70 | |
| Tint example 2 | | | 70 |
| Letdown binder[6] | 30 | 30 | 30 |

[6]Binder mixture consists of an self-crosslinkable acrylic latex (U.S. Pat. No. 5006413, example 1, 35% in water) and a polyurethane dispersion with polycarbonate soft segments and urethane/urea hard segments.

Preparation

The tints were mixed with the letdown binder and adjusted to the required viscosity (2000–25000 cps) with Acrysol® ASE-60. pH value was adjusted with ammonia to 8.0–8.5. Basecoats were sprayed on a primed substrate by automatic spray applicator under controlled conditions (20° C., 50–55% relative humidity). After drying the basecoats were coated over with a two component polyurethane clearcoat (50 microns). The basecoat/clearcoat system was baked for 30 minutes at 60° C.

| Results: | Paint Comparative Example 1 | Paint Example 1 | Paint Example 2 |
|---|---|---|---|
| Color[1]HOB | 115.3 | 118.5 | 119.5 |
| Flop | 9.70 | 10.02 | 9.81 |
| Gassing stability[2] | | | |
| 7 days | OK | OK | OK |
| 14 days | NOK | OK | OK |
| 21 days | | OK | NOK |
| 28 days | | OK | |
| Gassing stability (mixed with iron oxide dispersion) | | | |
| 7 days | OK | OK | OK |
| 14 days | NOK | OK | OK |
| 21 days | | OK | NOK |
| 28 days | | OK | |

Measurements:

(1) Color:

Color values were measured with a multi-angle calorimeter.

HOB (Head on Brightness) is the lightness value measured under an angle of 15°.

Flop: This parameter was calculated from the following equation:

$$\text{Flop} = (2.69 * (L_{15°} - L_{110°})^{1.11}) / (L_{45°})^{0.86}$$

$L_{15°}$ = L value Near Specular angle
$L_{110°}$ = L value High angle
$L_{45°}$ = L value Flat angle (2) Gassing Stability:

Basecoat formulations were put in a sealed metal container in an oven at 50° C. for 4 weeks. Every week the container was inspected for pressure build up.

The refinish water borne basecoats according to the invention (paint example 1 and 2) showed a better gassing stability (stable for a longer time) and improved aluminum flop and head on brightness compared with a refinish water borne basecoat according to prior art (paint comparative example 1).

3. Preparation of OEM Water Borne Basecoats with the Phosphonic Acid—Epoxy Adducts:

In comparative example 2 a known passivator (Lubrizol® 2062) was used instead of the passivator according to the invention.

Preparation of Aluminum Slurries in Solvent:

| Ingredient (grams) | Slurry Comparative Example 2 | Slurry Example 3 | Slurry Example 4 | Slurry Example 5 |
|---|---|---|---|---|
| Ethylene glycol mono butyl ether | 43.4 | 43.4 | 43.3 | 43.3 |
| Ethylene glycol mono hexyl ether | 19.8 | 19.8 | 19.8 | 19.8 |
| Isopar ® H[1] | 19.8 | 19.8 | 19.8 | 19.8 |
| Lubrizol ® 2062[2] | 15.4 | | | |
| Phosphonic preparation example 1 | | 10.9 | | |
| Phosphonic preparation example 2 | | | 18.1 | |
| Phosphonic preparation example 3 | | | | 25.1 |
| Mobilux ® 33313[3] | 76.7 | 76.7 | 76.7 | 76.7 |
| Amino Methyl propanol (95% in water) | 2.1 | 2.3 | 2.3 | 2.3 |

[1] Mineral Spirit (Exxon)
[2] Phosphoric acid based passivator from Lubrizol Co
[3] Aluminum flakes from Eckart Corporation Preparation: The solvents were mixed for 5 minutes and next the Aluminum flakes were added followed by the passivator after which the mixture was stirred for 15 minutes. Next the amino methyl propanol was added.

OEM Water Borne Basecoat—Preparation:

| Formulation: Ingredient | Paint comparative example 2 | Paint Example 3 | Paint Example 4 | Paint Example 5 |
|---|---|---|---|---|
| Slurry comp. example 1 | 177.2 | | | |
| Slurry example 3 | | 172.9 | | |
| Slurry example 4 | | | 180.1 | |
| Slurry example 5 | | | | 187.1 |
| Letdown binder[4] | 162 | 162 | 162 | 162 |
| Deionized water | 60.8 | 65.1 | 57.9 | 50.9 |

[4] acrylic latex with core-shell morphology (U.S. Pat. No. 4,403,003, example 4, 30% solids content)

The letdown binder and deionized water were added and stirred for 20 minutes at moderate speed. The final pH value of all paints was about 8.6–8.8.

Results

| | Paint Comparative Example 2 | Paint Example 3 | Paint Example 4 | Paint Example 5 |
|---|---|---|---|---|
| Color[1] HOB | 151 | 150 | 148 | 145 |
| Flop | 18 | 18 | 17 | 16 |

| | Paint Comparative Example 2 | Paint Example 3 | Paint Example 4 | Paint Example 5 |
|---|---|---|---|---|
| Gassing stability[2] Milliliter $H_2$/g Alu | 0.58 | 0.37 | 0.30 | 0.37 |

Measurements:
(1) Color:

Color values were measured with a multi-angle calorimeter.

HOB (Head on Brightness) is the lightness value measured under a angle of 15°

Flop: This parameter was calculated from following equation:

$$\text{Flop} = (2.69 * (L_{15°} - L_{110°})^{1.11}) / (L_{45°})^{0.86}$$

$L_{15°}$=L value Near Specular angle
$L_{110°}$=L value High angle
$L_{45°}$=L value Flat angle (2) Gassing Stability:

The gassing is expressed as the milliliter of hydrogen formed per gram of solid aluminum at 60° C. per 10 hours.

The OEM water borne basecoats according to the invention (paint example 3, 4 and 5) showed a much better gassing stability and approximately the same aluminum flop and head on brightness compared with a OEM water borne basecoat according to prior art (paint comparative example 2).

What is claimed is:

1. An aqueous coating composition comprising:
   A) at least one reaction product of
      (a) 5 to 95 weight percent of at least one phosphonic acid derivative selected from compound I and II

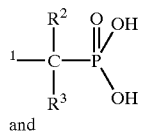

and

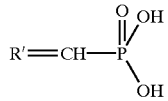

wherein $R^1$ is H or $O=P(OH)_2$; $R^2$ and $R^3$ are independently H, OH or an aliphatic, cycloaliphatic and aromatic substituent having 1 to 25 carbon atoms and optionally up to 10 heteroatoms selected from the group consisting of oxygen, silicon and phosphorus; and R' is an aliphatic, cycloaliphatic or aromatic substituent having 1 to 25 carbon atoms and optionally up to 10 heteroatoms selected from the group consisting of oxygen, silicon and phosphorus;
      (b) 5 to 95 weight percent of at least one compound having at least two epoxy groups and a number average molecular weight Mn of 300 to 5000 g/mol; and
      (c) 0 to 90 weight percent of a compound having one epoxy-functional group, wherein the proportions by weight of components (a), (b) and (c) total 100 weight percent;
   B) at least one metallic pigment;
      wherein the amount of phosphorus in the reaction product A) is 0.2–5.0 percent by weight, based on the weight of the metal pigment B).

2. The aqueous coating composition of claim 1 further comprising at least one film forming binder, water and optionally organic solvents, additives and pigments, with the proviso that the pigments are different from the metallic pigments of component B).

3. The aqueous coating composition of claim 2 wherein the at least one film forming polymer is selected from the group consisting of (meth)acrylic copolymer, polyurethane, polyester and alkyd resin.

4. The aqueous coating composition of claim 2 further comprising at least one cross-linking agent.

5. The aqueous coating composition of claim 1 wherein component A) is a reaction product of 10–60 weight percent of component a), 40–90 weight percent of component b) and 0–60 weight percent of component c), wherein the proportions by weight of component (a), (b) and (c) total 100 weight percent.

6. The aqueous coating composition of claim 1 wherein the reaction product A) has a number average molecular weight Mn of 400–20 000 g/mole and an acid number of 20–300 mg KOH/g.

7. The aqueous coating composition of claim 1 wherein the phosphonic acid derivative a) is selected from the group consisting of propyl, octyl and vinylphosphonic acid.

8. The aqueous coating composition of claim 1 wherein the epoxide compound b) is a polyglycidyl ether based on polyhydric phenols.

9. The aqueous coating composition of claim 8 wherein the epoxide compound b) is the diglycidyl ether of bisphenol A.

10. The aqueous coating composition of claim 1 wherein the metal pigment B) is aluminum pigment.

11. A multilayer coating comprising a base coat and a clear coat, wherein the base coat comprises an aqueous coating composition comprising:
   A) at least one reaction product of
      (a) 5 to 95 weight percent of at least one phosphonic acid derivative selected from compound I and II

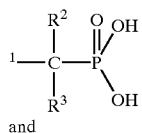

and

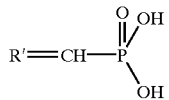

wherein $R^1$ is H or $O=P(OH)_2$; $R^2$ and $R^3$ are independently H, OH or an aliphatic, cycloaliphatic and aromatic substituent having 1 to 25 carbon atoms and optionally up to 10 heteroatoms selected from the group consisting of oxygen, silicon and phosphorus; and R' is an aliphatic, cycloaliphatic and aromatic substituent having 1 to 25 carbon atoms and optionally up to 10 heteroatoms selected from the group consisting of oxygen, silicon and phosphorus;
      (b) 5 to 95 weight percent of at least one compound having at least two epoxy groups and a number average molecular weight Mn of 300 to 5000 g/mol; and
      (c) 0 to 90 weight percent of a compound having one epoxy-functional group, wherein the proportions by weight of components (a), (b) and (c) total 100 weight percent; and
   B) at least one metallic pigment.

12. An aqueous coating composition comprising:
   A) at least one reaction product of
      (a) 5 to 95 weight percent of at least one phosphonic acid derivative selected from compound I and II

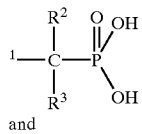

and

-continued

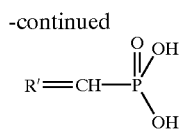

wherein $R^1$ is H or $O=P(OH)_2$; $R^2$ and $R^3$ are independently H, OH or an aliphatic, cycloaliphatic and aromatic substituent having 1 to 25 carbon atoms and optionally up to 10 heteroatoms of at least one of oxygen and phosphorus; and R' is an aliphatic, cycloaliphatic and aromatic substituent having 1 to 25 carbon atoms and optionally up to 10 heteroatoms of at least one of oxygen and phosphorus, (b) 5 to 95 weight percent of at least one compound having at least two epoxy groups and a number average molecular weight Mn of 300 to 5000 g/mol; and (c) 0 to 90 weight percent of a compound having one epoxy-functional group, wherein the proportions by weight of components (a), (b) and (c) total 100 weight percent;

wherein the reaction product A) is in the form of a salt; and

B) at least one metallic pigment.

* * * * *